US012655862B2

(12) United States Patent (10) Patent No.: US 12,655,862 B2
Ong (45) Date of Patent: Jun. 16, 2026

(54) CONNECTOR

(71) Applicant: Seng Ann Ong, Klang (MY)

(72) Inventor: Seng Ann Ong, Klang (MY)

( * ) Notice: Subject to any disclaimer, the term of this patent is extended or adjusted under 35 U.S.C. 154(b) by 259 days.

(21) Appl. No.: 18/636,937

(22) Filed: Apr. 16, 2024

(65) Prior Publication Data

US 2025/0172166 A1 May 29, 2025

(30) Foreign Application Priority Data

Nov. 27, 2023 (MY) ............................. PI2023007202

(51) Int. Cl.
*F16B 12/46* (2006.01)

(52) U.S. Cl.
CPC ........ *F16B 12/46* (2013.01); *F16B 2012/466* (2013.01)

(58) Field of Classification Search
CPC ........ F16B 12/10; F16B 12/12; F16B 12/125; F16B 12/20; F16B 12/2009; F16B 12/2027; F16B 12/2036; F16B 12/2054; F16B 12/2063; F16B 2012/2018; F16B 2012/2045; F16B 2012/2072; F16B 2012/209; F16B 13/04; F16B 13/06; F16B 13/063; A47B 2230/0029; A47B 2230/0033; A47B 2230/0044; A47B 2230/0048; A47B 2230/0051
See application file for complete search history.

(56) References Cited

U.S. PATENT DOCUMENTS

| | | | | |
|---|---|---|---|---|
| 5,772,353 A | * | 6/1998 | Grieser | F16B 12/2036 403/231 |
| 6,142,700 A | * | 11/2000 | Grieser | F16B 12/2036 403/DIG. 12 |
| 6,257,796 B1 | * | 7/2001 | Salice | F16B 12/2009 403/231 |
| 8,562,239 B1 | * | 10/2013 | Liu | F16B 12/20 403/252 |

(Continued)

FOREIGN PATENT DOCUMENTS

| | | | |
|---|---|---|---|
| CN | 2382877 Y | * | 6/2000 |
| CN | 102011776 | | 4/2011 |

(Continued)

OTHER PUBLICATIONS

English Abstract of CN102011776.

*Primary Examiner* — Jonathan P Masinick
(74) *Attorney, Agent, or Firm* — Preston Smirman; SMIRMAN IP LAW, PLLC

(57) ABSTRACT
A connector for joining furniture panels, including a main body configured to be inserted into a recess located adjacent an edge of a first furniture panel, the main body including a tenon head extending outwardly from the main body and extending beyond the edge of the first furniture panel, wherein the tenon head is configured to be inserted into an aperture of a second furniture panel, thereby joining the first and second furniture panels, a cavity within the main body, and a rod rotatably disposed within the cavity, wherein the rod comprises a distal end extended to the tenon head, and a handle which is flappable to rotate the rod between a (Continued)

30

1

20 locking configuration where the distal end expands the tenon head to firmly engage the aperture and an unlock configuration where the tenon head remains unexpanded.

14 Claims, 8 Drawing Sheets

(56) References Cited

U.S. PATENT DOCUMENTS

| | | | | |
|---|---|---|---|---|
| 2008/0084143 A1 * | 4/2008 | Ho | .................... | F16B 12/2009 |
| | | | | 312/111 |
| 2009/0206613 A1 * | 8/2009 | Hawang | ............... | E05B 65/006 |
| | | | | 292/57 |
| 2020/0232494 A1 * | 7/2020 | Liu | ...................... | F16B 13/063 |
| 2023/0287918 A1 * | 9/2023 | Birkner | .............. | F16B 12/2036 |

FOREIGN PATENT DOCUMENTS

| | | | | | | |
|---|---|---|---|---|---|---|
| DE | 2546526 | A1 | * | 4/1977 | | |
| DE | 10206335 | A1 | * | 8/2003 | .......... | F16B 12/2009 |
| DE | 202015105329 | U1 | * | 1/2017 | ............. | F16B 12/10 |
| EP | 1008767 | A1 | * | 6/2000 | ............. | F16B 12/46 |
| GB | 2004615 | A | * | 4/1979 | ......... | F16B 12/2063 |
| GB | 2457480 | A | * | 8/2009 | ............. | F16B 21/02 |
| JP | 2001241412 | A | * | 9/2001 | | |
| KR | 200467577 | Y1 | * | 6/2013 | .......... | A47B 96/066 |
| KR | 200475714 | Y1 | * | 12/2014 | | |

* cited by examiner

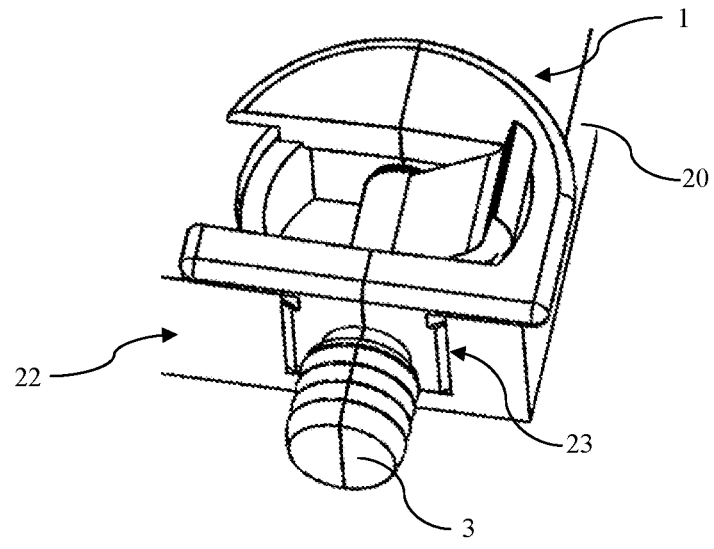
Fig. 3
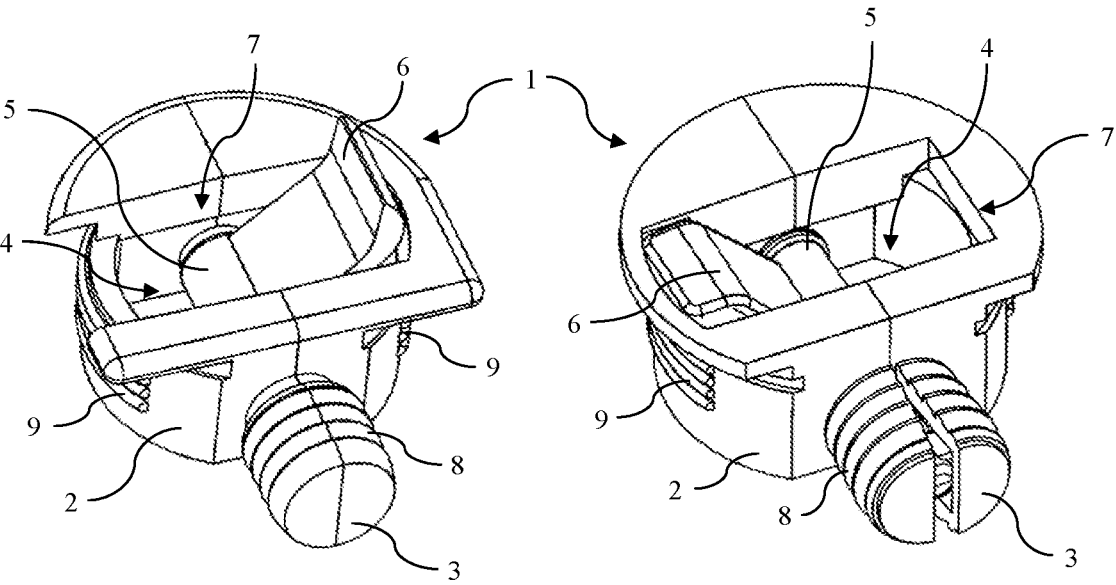
Fig. 4A                                        Fig. 4B

CONNECTOR

CROSS-REFERENCE TO RELATED APPLICATION

The instant application claims priority to Malaysia Patent Application Serial No. PI2023007202 filed Nov. 27, 2023, the entire specification of which is expressly incorporated herein by reference.

FIELD OF THE INVENTION

The invention relates to a connector. More particularly, the invention relates to a connector for joining furniture panels without requiring traditional tools and enables a tool-free approach to assemble or disassemble a furniture assembly.

BACKGROUND OF THE INVENTION

Traditional furniture is typically assembled as a whole before shipping, which can make it challenging to fit through doorways and into tight spaces. Additionally, this type of furniture is often prone to damage during transport, leading to costly repairs and replacements. To address these challenges, a new concept in furniture design has emerged, which is known as the knockdown furniture. This type of furniture is designed with detachable assembly connections, allowing it to be taken apart and put back together again quickly and easily. This approach reduces the space required for storage and transportation, resulting in lower transportation costs and less damage during transport.

One of the primary benefits of knockdown furniture is that it can be assembled and disassembled quickly and easily, without the need for special tools or equipment such as screwdrivers, wrenches, or hammers. This is made possible by the use of special design joints that allow for easy attachment and detachment of the various components of the furniture. These joints are designed to fit together seamlessly and securely, ensuring that the furniture is stable and sturdy once assembled. With the rise of modular furniture, detachable assembly connections have become even more important, as they allow for greater flexibility and customization in furniture design.

There are a few patented technologies over the prior art relating to the joint design as discussed earlier. Of interest in respect to an improved pushing type furniture connecting assembly is CN102011776A. The patent discloses an enhanced furniture connector component employing the mortise and tenon principle. The component comprises interlocking male and female parts. The male part features an expandable insertion portion and an internal cavity housing a pushable rod. The pushable rod is equipped with a handle and a protruding lobed section. Upon inserting the male part's insertion portion into the female part's receiving portion, the user can push the pushable rod via the handle towards the insertion portion, causing the protruding lobed section to move into the insertion portion and thereby expanding the insertion portion to secure the connection and prevent detachment.

Despite being practical and reliable for joining furniture panels, this furniture connector still has its limitations. One significant drawback is the requirement for an additional installation process. Specifically, the female part needs to be inserted into a pre-fabricated hole on the furniture panels via tools such as hammers, which contradicts the key advantage of tool-less assembly that is often associated with knockdown furniture. Furthermore, if the extra installation step were to be performed during the manufacturing process by pre-inserting the female part, it would inevitably lead to an increase in both the time and cost of producing the furniture.

Accordingly, it would be desirable to provide a furniture connector that is capable of overcoming the abovementioned drawbacks. This invention provides such a furniture connector.

SUMMARY OF THE INVENTION

In one aspect of the invention, there is provided a connector for joining furniture panels, the connector comprises a main body configured to be inserted into a recess located adjacent an edge of a first furniture panel, the main body includes: a tenon head extending outwardly from the main body and extending beyond the edge of the first furniture panel, wherein the tenon head is configured to be inserted into an aperture of a second furniture panel, thereby joining the first and second furniture panels; a cavity within the main body; and a rod rotatably disposed within the cavity, wherein the rod comprises a distal end extended to the tenon head, and a handle which is flappable to rotate the rod between a locking configuration where the distal end expands the tenon head to firmly engage the aperture and an unlock configuration where the tenon head remains unexpanded.

Preferably, the distal end of the rod can be extended into a slot located within the tenon head.

Preferably, the distal end may include at least one bulge arranged in such a way that, during the unlock configuration, the bulge fits within the slot, and when the rod is rotating towards the locking configuration, the bulge exerts pressure against the slot, causing the tenon head to expand.

Preferably, the at least one bulge has a tapered surface to gradually increase friction against the slot as the rod rotates towards the locking configuration such that the increased friction effectively secures the rod in the locking configuration.

Preferably, the slot may include at least one curved dent to allow initial movement for the at least one bulge.

Preferably, the tenon head or the main body can be formed by two parts, and the expansion of the tenon head is caused by the exerted pressure of the bulge that moves or separates the two parts apart from each other.

Preferably, the cavity of the main body and/or the slot of the tenon head may include an inner spiral groove for receiving a helical ridge on an external surface of the rod in such a way that the rotation of the rod will cause the rod to move in a forward or backward direction with respect to the tenon head.

Preferably, the distal end of the rod may include a gradually extended portion which can be fitted to the slot of the tenon head, the slot includes a narrowed passageway where the gradually extended portion can transition thereinto for expending the tenon head when the rod moves in the backward direction with respect to the tenon head.

Preferably, the tenon head or the main body may be formed by two parts, and at least a portion of the two parts are separated, when the gradually extended portion transitioned into the narrowed passageway of the slot, to expand the tenon head.

Preferably, the main body may include one or more pegs to be inserted into one or more corresponding holes for joining the two parts together.

Preferably, an outer surface of the tenon head may have a serrated jaw profile formed by a plurality of tooth-like projections to penetrate into a surface of the aperture during the expansion of the tenon head.

Preferably, an outer surface of the main body may have a serrated jaw profile formed by a plurality of tooth-like projections that secure the main body in the recess upon insertion.

Preferably, the main body may include a top opening for the handle of the rod to be extended beyond a top surface of the main body.

Preferably, the handle includes a first surface and a second surface, which are respectively visible during the locking configuration and the unlock configuration, the first surface includes a first indicator that represents the connector is in the locking configuration and the second surface includes a second indicator that represents the connector is in the unlock configuration.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

FIG. 3 is a schematic diagram illustrating a tenon head of the connector (first embodiment).

FIG. 4A is a schematic diagram illustrating a top perspective view of the connector before assembly in an unlock configuration (first embodiment).

FIG. 4B is a schematic diagram illustrating a top perspective view of the connector before assembly in a locking configuration (first embodiment).

DETAILED DESCRIPTION OF THE INVENTION

The invention will now be described in greater detail, by way of example, with reference to the drawings.

Figure 1:
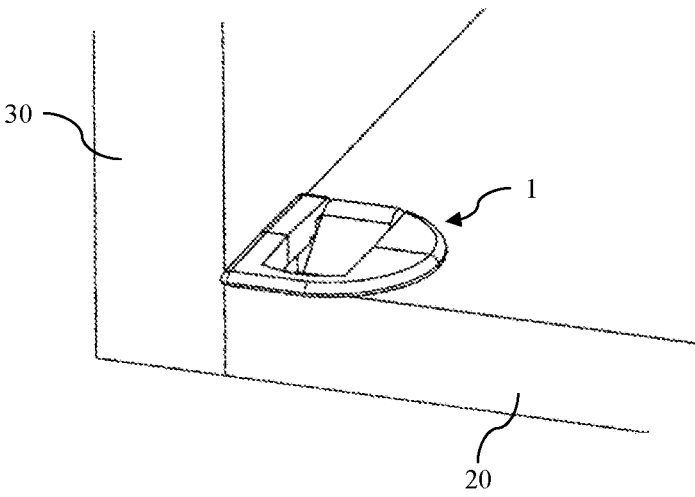
FIG. 1 is a schematic diagram illustrating a connector for joining furniture panels (first embodiment).
Figure 2:
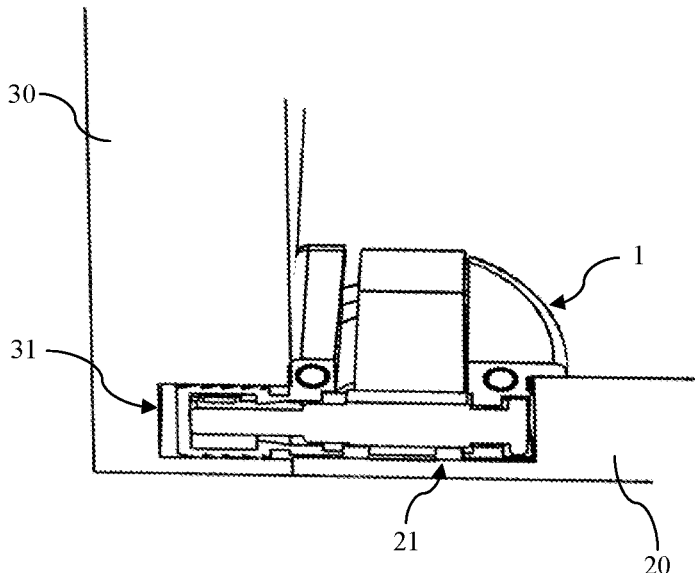
FIG. 2 is a schematic diagram illustrating a cross section view of the connector within the joined furniture panels (first embodiment).

Referring to FIG. 1, a connector 1 is utilised to join a pair of furniture panels 20, 30 together. The furniture panels 20, 30, which can be made of, but is not limited to, plywood, medium density fibreboard, particleboard, oriented strand board, solid wood, laminated panels, glass, and metal panels, are preferably joined at a right angle to each other. Specifically, a first furniture panel 20 is positioned horizontally while a second furniture panel 30 is vertically arranged.

Figure 7:
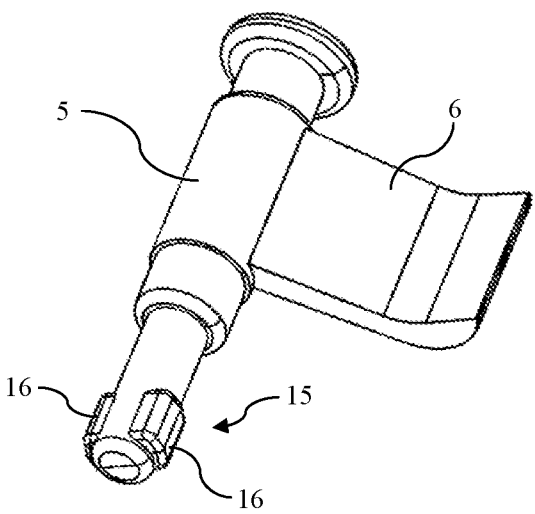
FIG. 7 is a schematic diagram illustrating a rod of the connector (first embodiment).
Figure 8A:
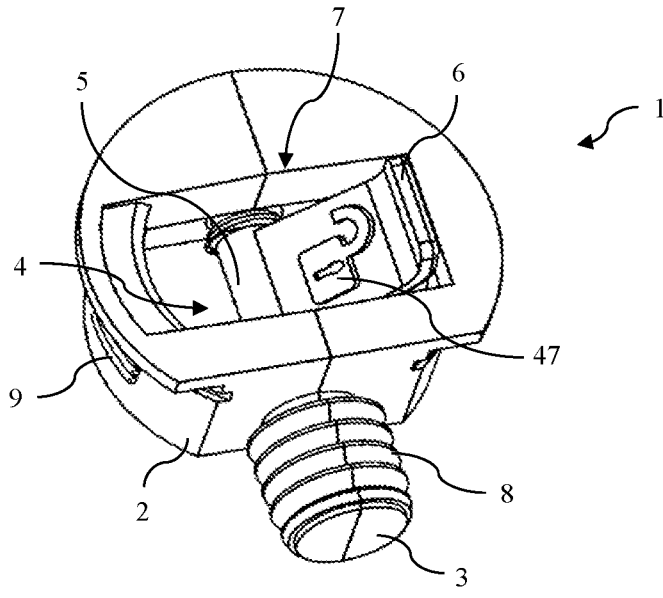
FIG. 8A is a schematic diagram illustrating a top perspective view of the connector before assembly in the unlock configuration (second embodiment).
Figure 8B:
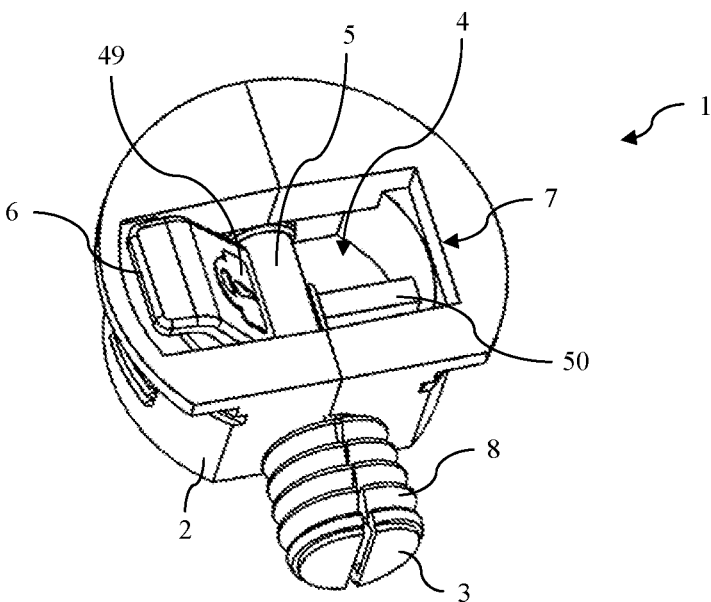
FIG. 8B is a schematic diagram illustrating a top perspective view of the connector before assembly in the locking configuration (second embodiment).

As shown in FIGS. 1 to 12B, the connector 1 comprises a main body 2 that incorporates three essential components. Firstly, a tenon head 3 extended outwardly from the main body 2. Secondly, a cavity 4 is situated within the main body 2. Thirdly, a rod 5 is positioned in a rotatable manner inside the cavity 4. This rod 5 includes a distal end 15 that extends to the tenon head 3. Additionally, a handle 6 is provided, which can be flipped to rotate the rod 5. Such rotation enables adjustment of the rod 5 between a locking configuration as shown in FIGS. 4B and 8B, where the distal end 15 expands the tenon head 3, and an unlock configuration as shown in FIGS. 4A and 8A, where the tenon head 3 remains unexpanded. Preferably, the main body 2 can be provided with a top opening 7 for the handle 6 of the rod 5 to be extended beyond a top surface of the main body 2.

The first furniture panel 20 incorporates a recess 21 located adjacent its edges 22 to accommodate the main body 2 of the connector 1, either partially or entirely. It is preferable for a significant portion of the main body 2 to fit inside the recess 21, while an exposing portion of the main body 2 slightly protrudes above the surface of the first furniture panel 20. Nevertheless, it is understood that the exposing portion, after insertion of the main body 2 into the recess 21, can also be at a similar level as the surface of the first furniture panel 20. In other words, the main body 2 can be flush or nearly flush with the surface of the first furniture panel 20, creating a smooth and seamless appearance. An outer surface of the main body 2 can include a plurality of rib-like projections 9 that secure the main body 2 in the recess 21 upon insertion.

Additionally, the recess 21 may feature a side opening 23 to allow the tenon head 3 of the connector 1 to extend beyond the edge 22 of the first furniture panel 20. This enables the insertion of the tenon head 3 into an aperture 31 located on the second furniture panel 30. The dimensions of the aperture 31 are designed to firmly receive the tenon head 3. Upon rotating the rod 5 towards the locking configuration, the distal end 15 of the rod 5 expands the tenon head 3, causing the tenon head 3 to firmly engage with the aperture 31. An outer surface of the tenon head 3 can include a serrated jaw profile 8 formed by a plurality of tooth-like projections to penetrate into a surface of the aperture 31 during the expansion of the tenon head 3. As a result, a secure connection is established between the first and second furniture panels 20, 30.

Figure 5:
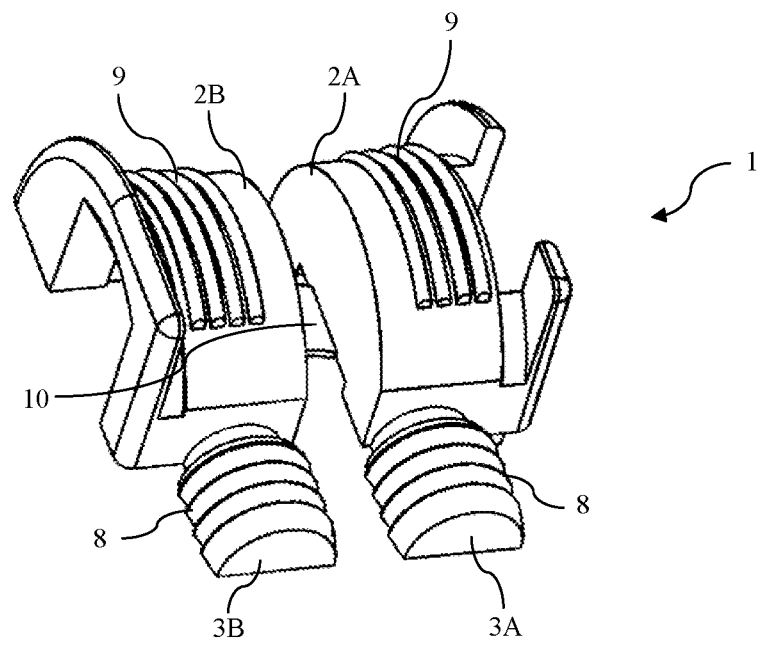
FIG. 5 is a schematic diagram illustrating a top perspective view of the connector in an expanded configuration (first embodiment).
Figure 6:
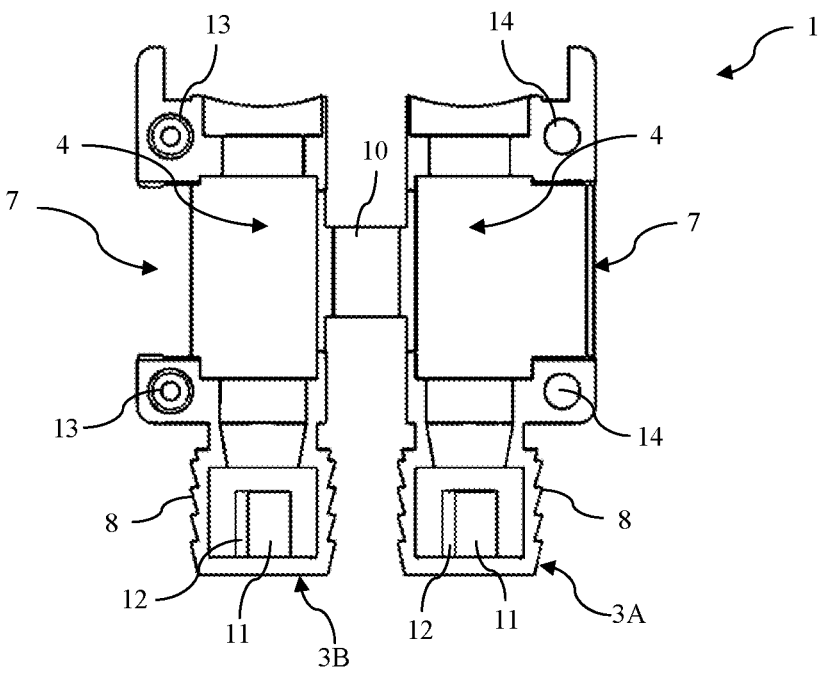
FIG. 6 is a schematic diagram illustrating a bottom view of the connector in the expanded configuration (first embodiment).

Referring to FIGS. 5 and 6, a first embodiment of the connector 1 is illustrated. The main body 2 and the tenon head 3 can be separated into two nearly identical parts 2A, 2B, 3A, 3B. Alternatively, only the tenon head 3 can be separated into two separate parts 3A, 3B, rather than the entire main body 2. To maintain their connection, a linkage 10 is provided between the two separated parts 2A, 2B, 3A, 3B, ensuring their cohesive operation. The two separated parts 2A, 2B, 3A, 3B can be joined together using one or more pegs 13, which can be inserted into corresponding holes 14 to form either the main body 2 or the tenon head 3.

Preferably, the tenon head 3 is provided with a slot 11 to which the distal end 15 of the rod 5 can be extended thereinto. As shown in FIG. 7, the distal end 15 includes at least one bulge 16 arranged in such a way that, during the unlock configuration, the bulge 16 fits within the slot 11, and when the rod 5 is rotating towards the locking configuration, the bulge 16 exerts pressure against the slot 11, causing the tenon head 3 to expand. The bulge 16 may include a tapered surface to gradually increase friction against the slot 11 as the rod 5 rotates towards the locking configuration such that the increased friction effectively secures the rod 5 in the locking configuration. The slot 11 includes at least one curved dent 12 to allow initial movement for the at least one bulge 16 or the rod 5. The curved dent 12 is a crucial factor that impacts the smoothness of the rod's 5 rotation. By way of example, the larger dents 12 results in smoother rotations. Since the tenon head 3 or the main body 2 is formed by two separated parts 2A, 2B, 3A, 3B, the expansion of the tenon head 3 is caused by the exerted pressure of the bulge 16 that moves or separates the two parts 3A, 3B of the tenon head 3 apart from each other in a sideway direction so that the expansion would not break the edge 22 of the first furniture panel 20.

Figure 9:
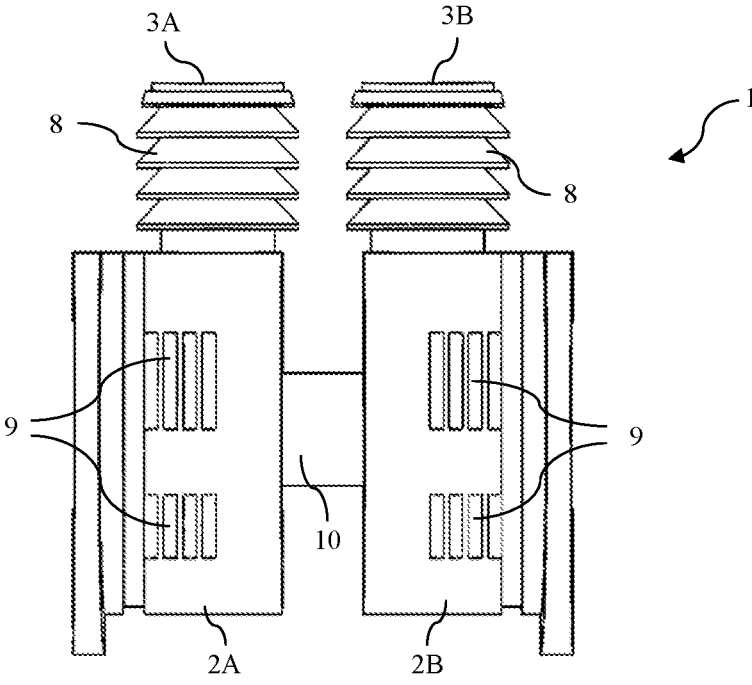
FIG. 9 is a schematic diagram illustrating a top perspective view of the connector in the expanded configuration (second embodiment).
Figure 10:
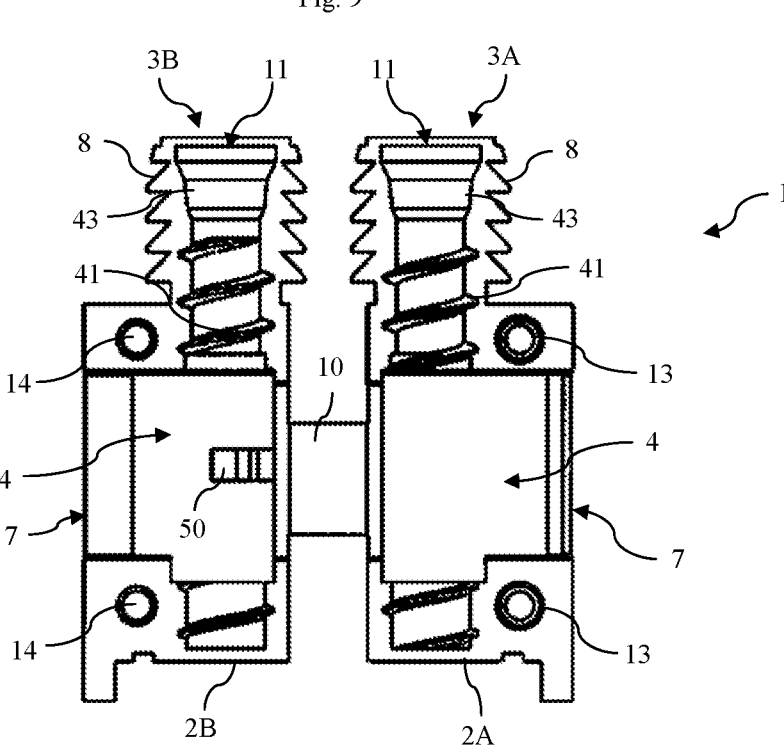
FIG. 10 is a schematic diagram illustrating a bottom view of the connector in the expanded configuration (second embodiment).

Referring to FIGS. 9 and 10, a second embodiment of the connector 1 is illustrated. The main body 2 and the tenon head 3 can be separated into two nearly identical parts 2A, 2B, 3A, 3B. Alternatively, only the tenon head 3 can be separated into two separate parts 3A, 3B, rather than the entire main body 2. To maintain their connection, a linkage 10 is provided between the two separated parts 2A, 2B, 3A, 3B, ensuring their cohesive operation. The two separated parts 2A, 2B, 3A, 3B can be joined together using one or more pegs 13, which can be inserted into corresponding holes 14 to form either the main body 2 or the tenon head 3.

Figure 11A:
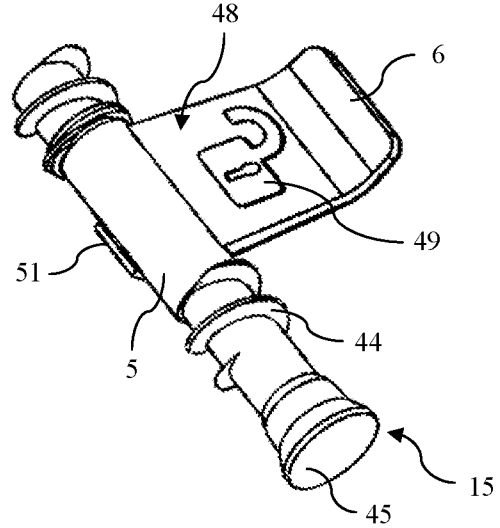
FIG. 11A is a schematic diagram illustrating the rod of the connector (second embodiment).
Figure 11B:
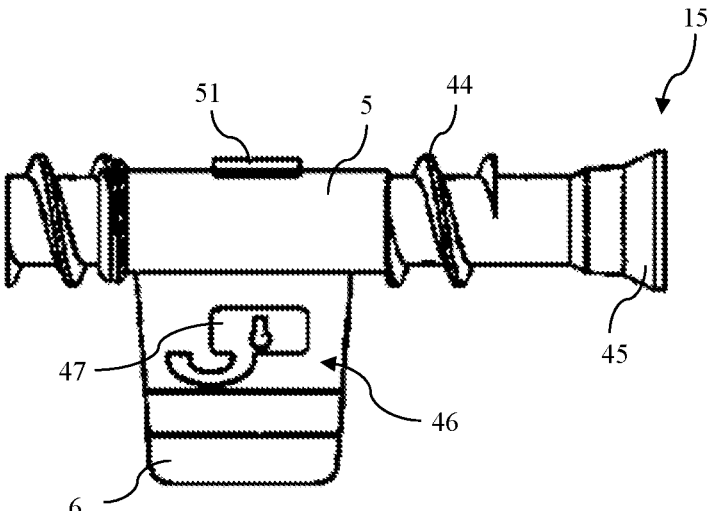
FIG. 11B is another schematic diagram illustrating the rod of the connector (second embodiment).

Preferably, the tenon head 3 is provided with a slot 11 to which the distal end 15 of the rod 5 can be extended thereinto. An inner surface of the cavity 4 can be provided with an inner spiral groove 41, which may extend to the slot 11 of the tenon head 3. Alternatively, the inner spiral groove 41 can be provided only within slot 11. As shown in FIGS. 11A and 11B, the rod includes a helical ridge 44 on its external surface. The helical ridge 44 can be rotatably fitted to the inner spiral groove 41. The helical ridge 44 and the inner spiral groove 41 are configured to move the rod 5 in a forward or backward direction with respect to the tenon head 3 depending on the direction of the rod's rotation. Preferably, the rod 5 moves in the forward direction when it is rotated towards the unlock configuration and in a backward direction when it is rotated towards the locking configuration. Preferably, the friction between the inner spiral groove 41 and the helical ridge 44 can be adjusted to sufficiently hold the rod in its respective configuration. In one preferred embodiment, a stopper configuration can be provided within the cavity 4 to secure the rod 5 in the locking configuration. Such a stopper configuration may include a protrusion 51 and a stopper wall 50. Specifically, the protrusion 51 protrudes from the rod 5, and the stopper wall 50 is positioned within the cavity. When the rod 5 is rotating towards the locking configuration, the protrusion 51 is moved to a position where it engages a surface of the stopper wall 50. The surface of the stopper wall 50 can be provided with a profile that allows the protrusion 51 to move into a lock position and prevents it from moving out of the lock position if no external force is exerted by a user.

Figure 12A:
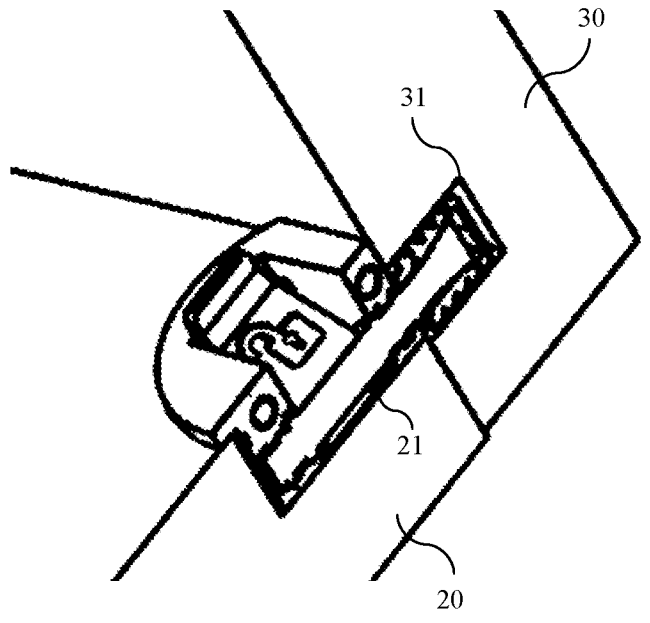
FIG. 12A is a schematic diagram illustrating a cross section view of the connector, in the unlock configuration, within the joined furniture panels (second embodiment).
Figure 12B:
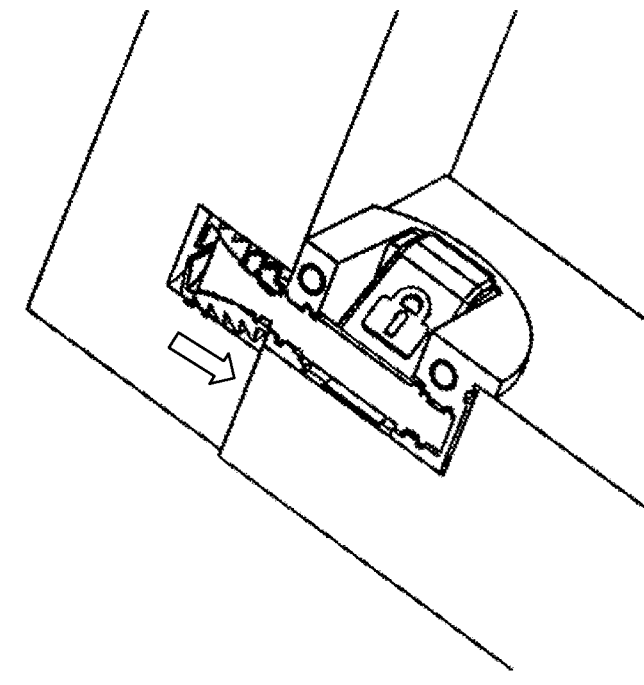
FIG. 12B is a schematic diagram illustrating a cross section view of the connector, in the locking configuration, within the joined furniture panels (second embodiment).

The distal end 15 of the rod includes a gradually extended portion 45 which can be fitted to the slot 11. In this embodiment, the slot 11 is preferably shaped to compliment the gradually extended portion 45. Preferably, the slot 11 can have a gradually increasing step profile that is complimentary to the gradually extended portion 45. Such profile includes a narrowed passageway 43 where the gradually extended portion 45 can transition thereinto when the rod 5 moves in the backward direction with respect to the tenon head 3. As shown in FIGS. 12A and 12B, when the gradually extended portion 45 is transitioned into the narrowed passageway 43, it expands the narrowed passageway 43 and thereby separates the two parts 3A, 3B of the tenon head 3 apart from each other in a sideway direction to engage with an inner surface of the aperture 31.

Referring back to FIGS. 8A and 8B, the handle 6 may include a first surface 46 and a second surface 48, which are respectively visible during the locking configuration and the unlock configuration. By way of example, one surface may be exposed and the other surface may be concealed when the rod 5 is rotated to either of the configurations. Preferably, the first surface 46 includes a first indicator 47 that represents the connector 1 is in the locking configuration and the second surface 48 includes a second indicator 49 that represents the connector 1 is in the unlock configuration. The first and second indicators 47, 49 can be attached, printed or embossed to their respective surfaces 46, 48. Specifically, the first and second indicators 47, 49 include but limited to icons, texts, or colors.

The connector 1 offers several key advantages, including the elimination of an additional component, commonly referred to as a female part, which would otherwise need to be inserted into the aperture 31 of the second furniture panel 30. The tenon head 3 of the connector 1 is specifically designed to securely engage with the aperture 31 when in the locking configuration. As a result, the connector 1 eliminates the need for additional components, the tools required for inserting those components, and ultimately helps reduce overall costs. Furthermore, the configuration of the rod 5 provides an efficient approach of expanding the tenon head 3 as compared to linear force application or pivot force application.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

What is claimed is:

1. A connector for joining furniture panels, comprising:
   a main body configured to be inserted into a recess located adjacent an edge of a first furniture panel, the main body includes:
   a tenon head extending outwardly from the main body and extending beyond the edge of the first furniture panel, wherein the tenon head is configured to be inserted into an aperture of a second furniture panel, thereby joining the first and second furniture panels;

a cavity within the main body; and a rod rotatably disposed within the cavity, wherein the rod comprises a distal end extended to the tenon head, and a handle which is flappable to rotate the rod between a locking configuration where the distal end expands the tenon head to firmly engage the aperture and an unlock configuration where the tenon head remains unexpanded.

2. The connector according to claim 1, wherein the distal end of the rod is extended into a slot located within the tenon head.

3. The connector according to claim 2, wherein the distal end includes at least one bulge arranged in such a way that, during the unlock configuration, wherein the bulge fits within the slot, and when the rod is rotating towards the locking configuration, the bulge exerts pressure against the slot, causing the tenon head to expand.

4. The connector according to claim 3, wherein the at least one bulge has a tapered surface to gradually increase friction against the slot as the rod rotates towards the locking configuration such that the increased friction effectively secures the rod in the locking configuration.

5. The connector according to claim 3, wherein the slot includes at least one curved dent to allow initial movement for the at least one bulge.

6. The connector according to claim 3, wherein the tenon head or the main body is formed by two parts, and the expansion of the tenon head is caused by the exerted pressure of the bulge that moves or separates at least a portion of the two parts of the tenon head apart from each other.

7. The connector according to claim 6, wherein the main body includes one or more pegs to be inserted into one or more corresponding holes for joining the two parts together.

8. The connector according to claim 2, wherein the cavity of the main body or the slot of the tenon head includes an inner spiral groove for receiving a helical ridge on an external surface of the rod in such a way that the rotation of the rod will cause the rod to move in a forward or backward direction with respect to the tenon head.

9. The connector according to claim 8, wherein the distal end of the rod includes a gradually extended portion which can be fitted to the slot of the tenon head, the slot includes a narrowed passageway where the gradually extended portion can transition thereinto for expending the tenon head when the rod moves in the backward direction with respect to the tenon head.

10. The connector according to claim 9, wherein the tenon head or the main body is formed by two parts, and at least a portion of the two parts are separated, when the gradually extended portion transitioned into the narrowed passageway of the slot, to expand the tenon head.

11. The connector according to claim 1, wherein an outer surface of the tenon head has a serrated jaw profile formed by a plurality of tooth-like projections to penetrate into a surface of the aperture during the expansion of the tenon head.

12. The connector according to claim 1, wherein an outer surface of the main body has a plurality of rib-like projections that secure the main body in the recess upon insertion.

13. The connector according to claim 1, wherein the main body includes a top opening for the handle of the rod to be extended beyond a top surface of the main body.

14. The connector according to claim 1, wherein the handle includes a first surface and a second surface, which are respectively visible during the locking configuration and the unlock configuration, the first surface includes a first indicator that represents the connector is in the locking configuration and the second surface includes a second indicator that represents the connector is in the unlock configuration.

* * * * *